United States Patent
Määttäet al.

(10) Patent No.: US 6,762,748 B2
(45) Date of Patent: Jul. 13, 2004

(54) COMPACT LOW PROFILE MAGNETIC INPUT DEVICE

(75) Inventors: Esa-Sakari Määttä, Tampere (FI); Marko Eromäki, Tampere (FI)

(73) Assignee: Nokia Corporation, Espoo (FI)

( * ) Notice: Subject to any disclaimer, the term of this patent is extended or adjusted under 35 U.S.C. 154(b) by 255 days.

(21) Appl. No.: 10/027,354

(22) Filed: Dec. 20, 2001

(65) Prior Publication Data

US 2002/0093328 A1 Jul. 18, 2002

(30) Foreign Application Priority Data

Dec. 27, 2000 (FI) ............................................. 20002859

(51) Int. Cl.[7] ................................................ G09G 5/08
(52) U.S. Cl. .................. 345/157; 345/160; 324/207.13
(58) Field of Search ................. 345/156–169; 324/200–206, 207.11, 207.23, 207.12, 207.26; 463/36–38

(56) References Cited

U.S. PATENT DOCUMENTS

| | | | |
|---|---|---|---|
| 4,853,630 A | * 8/1989 | Houston | 324/208 |
| 5,432,530 A | * 7/1995 | Arita et al. | 345/159 |
| 5,504,502 A | 4/1996 | Arita et al. | 345/160 |
| 5,698,976 A | 12/1997 | Nakajima et al. | 324/207.23 |
| D415,770 S | 10/1999 | Nuovo | D14/248 |
| 5,977,952 A | 11/1999 | Francis | 345/163 |
| 5,977,955 A | 11/1999 | Jaeger | 345/172 |
| 6,043,806 A | * 3/2000 | Atwell et al. | 345/161 |
| D423,515 S | 4/2000 | Phillips et al. | D14/247 |
| 6,606,085 B1 | * 8/2003 | Endo et al. | 345/161 |
| 6,611,139 B1 | * 8/2003 | Jackson | 324/207.2 |

FOREIGN PATENT DOCUMENTS

| | | |
|---|---|---|
| EP | 0901262 A2 | 3/1999 |
| WO | WO 00/70438 | 11/2000 |

* cited by examiner

*Primary Examiner*—Lun-Yi Lao
(74) *Attorney, Agent, or Firm*—Perman & Green, LLP

(57) ABSTRACT

The invention discloses a low profile input device for moving a cursor, scrolling a page, or selecting a function on a display of a handheld device. In an embodiment of the invention, a planar joystick (402,940) for use moving a cursor on the display of a handheld device comprises a movable sliding button having a first magnet M1 embedded therein. The button is slid by a user's finger over a second magnet M2, an action that distorts the magnetic flux 418 which is detected by a plurality of magnetic flux sensors 420. The direction and magnitude of the cursor movement on the display correspond to the change in flux caused by the movement of the sliding button.

14 Claims, 10 Drawing Sheets

COMPACT LOW PROFILE MAGNETIC INPUT DEVICE

FIELD OF INVENTION

The present invention relates generally to input pointing devices, more particularly, it relates to compact low profile input device suitable for use in handheld devices for moving a cursor, scrolling, and navigation and selection of objects on a display.

BACKGROUND OF THE INVENTION

Pointing devices have long been used with computers for facilitating user interaction with graphical user interfaces associated with computer operating systems by, for example, providing means for general navigation and selection of objects. Generally speaking, pointing devices are input devices that are used to move a cursor quickly and accurately to a desired position on a display. Dedicated pointing devices offer far greater utility for cursor movement than pressing the arrow keys on the keyboard, for example. Some of the most common pointing devices include mice, trackballs, touchpads, joysticks, and light pens. The mouse is the input device that is by far the most commonly used with computers. Typically, the mouse is an external device connected to the computer that translates user hand motion into signals that the computer understands to move the cursor in the desired direction on the screen. Similar in function, a trackball is an input devices that is a relatively large sphere that users rotate with their fingers to move the cursor. These have been particularly popular with CAD (Computer Aided Design) users for precision work but they often have a relatively high learning curve for the casual user.

Another type of pointing device that is widely used with computers are touchpads. Although, touchpads have been primarily used on laptops because they can be easily integrated into the unit, they have been becoming more popular for use with desktop computers as well. Cursor movement is performed by dragging the tip of the finger across the touchpad surface and tapping the surface to click on an object. Touchpad use also has a bit of learning curve since tactile feedback is lacking i.e. provides no analog force feedback to aid the user, especially when approaching the edges of the touchpad. Tactile feedback often aids the user in controlling the movement of the cursor, for example, by increasing or slowing the speed at which the cursor moves by pressing or moving a greater or lesser amount with the pointing device. Furthermore, the nature of touchpads requires a certain amount of surface area to move your finger around thus making them unsuitable for use in small handheld devices. In the case of touchscreens, where the user points to a location on the screen that is responsive to a pointing device such as a pen or stylus, this input technique also lacks tactile feedback and requires an external stylus which the user must carry around.

Joysticks are widely used in gaming applications where cursor movement is effected by moving the free end of the joystick about a pivoting end. Although joysticks present and intuitive way to move around the screen, they have the drawback of being relatively large (i.e. extended shaft and knob). This aspect makes them particularly unsuitable for use in compact environments such as laptops, not to mention smaller devices such as PDAs (Personal Digital Assistant) etc. Moreover, normal use of the joystick results in mechanical stress applied to soldering pads and rollers which decreases its reliability over time. Light pens are very intuitive and easy to use since one just points to a desired location on the screen for navigation or selection. However, the effectiveness of light pens is greatly dependent on the size of the screen and they become increasing more difficult to use with handheld devices with small screens, for example.

Although each of the described prior art pointing devices have their advantages in certain respects, they are not suitable for use in the new generation of compact handheld devices. Touchscreens have been successfully employed in these smaller devices but they suffer from the lack of tactile feedback and the inconvenience of using a stylus that must be tucked away in the device housing that adds bulk. It should be noted that the term handheld devices is used herein refers to portable devices such as personal digital assistants and wireless communicator devices such as the Nokia 9110 Communicator and its successors. Many of these devices are typically characterized in that the display, the keyboard, typically a QWERTY format keyboard which provides more convenient character input for the user, and the pointing device are integrated into a main unit as opposed to being separately attached. A significant attribute of handheld devices is that their small form factor makes them convenient, lightweight and easy to carry. This in turn places strict limits on the amount of space a pointing device can occupy.

A common feature of a cellular phone today is short messaging (SMS), wherein the user types a short textual message using the conventional keypad of the phone and then sends it to another cellular phone. As the short messaging and other applications typically related with interaction between users, such as electronic mail, are developed and become commonly used, the conventional keypad of the cellular phone may not fulfill the requirements of a user. One key factor is the ease and speed of typing a message. Some manufacturers have anticipated this and provided an additional separate keypad unit attachable to a cellular phone (such as the Ericsson Chatboard). These devices are preferably small and lightweight, yet providing an alphabetic keyboard with additional access keys for common functions, such as the aforementioned mail and SMS and also preferably a set of keys for moving the cursor. As the functions of cellular phones evolve, a need for a low profile device for moving the cursor is anticipated for also this kind of auxiliary units.

Cellular phones with conventional key or keypad arrangements such as is disclosed in USD423,515, or other types such as disclosed in USD415,770 are commonly used. The increasing use of additional functions and features of the cellular phone, such as games, internet access, calendar functions and such, may require the manufacturer of the cellular phone to incorporate a scrolling device into the device. One example of such device is disclosed in EP 901 262. This navigation key provides a rather compact construction for a relatively small device, allowing the user to e.g. scroll menus, select functions, etc. However, as the form of the roller key suggests, the roller key requires some space within the device and therefore is not preferred for a very low profile handheld device, especially not for a clamshell type of a device. Further, these navigation keys typically allow moving the cursor or selection to two directions only, i.e. up-down, right-left, and cannot therefore be effectively used for functions requiring free cursor movement.

U.S. Pat. No. 5,504,502 describes a pointing control device that is suitable for use on laptop computers. The device construction details a movable actuating member containing a magnet that is detected by magnetic reluctance detectors and where the member is returned to the center position by a spring. However, the construction has the drawback of being relatively complicated whereby the supporting structure and the spring must be constructed into the device housing. This makes the device less compact with respect to height and thus, although satisfactory for use in relatively larger laptop computers, it is less useful for relatively small handheld devices, particularly those employing a folding clamshell design. Moreover, the single magnet used in the described device produces a relatively weak magnetic field. Thus the reluctance detectors must be very sensitive thereby adding to the overall bulk of the construction. Also, because of the spring force the device is rather onerous in use on ones finger or thumb, whereby the user will easily find the device unsuitable for longer use.

FIG. 1 shows a handheld communicator type device that exemplifies the space layout constraints inherent in many small footprint devices. The device is comprised of a main unit 100 into which a plurality of keys 104 forming keyboard are integrated into surface 108 of main unit. For improved compactness, the device is constructed of a two piece folding clam shell design pivoting about hinge 116 which is comprised of the main unit 100 and an upper portion 118 containing a display 120. Due to the small footprint, there is very little space on surface 108 for a pointing device of the kind described above. To control cursor movement, a group of four arrow keys 112 are employed for movement in a corresponding direction of the arrow. The use of arrow keys, similar in function to those on a PC keyboard, works well as a space saving solution for rudimentary movement of the cursor. However, pushing arrow keys typically moves the cursor or scrolls the screen in discrete steps which do not provide the smooth and efficient movement provided by other pointing devices. Moreover, arrow keys do not provide the tactile feedback necessary to aid the user during navigation or scrolling.

In view of the foregoing disadvantages set forth above, it is an objective of the present invention to provide an input device and scrolling mechanism that is compact, efficient and provides suitable tactile feedback for effective use in small handheld devices.

SUMMARY OF THE INVENTION

Briefly described and in accordance with an embodiment and related features of the invention, there is provided an input device for moving a cursor on a display screen comprising:

a device housing;

a movable sliding member having a first ferromagnetic element attached thereto;

a second ferromagnetic element located in a fixed position relative to the first ferromagnetic element; and at least two sensors for measuring the relative movement of the sliding member.

In a apparatus aspect there is provided an electronic device comprising a display screen for displaying a cursor during operation of the device, the electronic device is characterized in that the device includes an input device for moving a cursor on a display comprising:

a movable sliding member having a first ferromagnetic element attached thereto;

a second ferromagnetic element located in a fixed position relative to the first ferromagnetic element; and at least two sensors for measuring the relative movement of the sliding member.

In a further input device aspect there is provided a sliding input device moving in discrete steps between a first fixed position and a second fixed position for selecting a function on a electronic device, the input device comprising:

a movable sliding member having a first magnet attached thereto;

a second magnet fixed in position at the first fixed position;

a third magnet fixed in position at the second fixed position a proximate distance from the first position;

a support layer for supporting the second magnet and the third magnet in their respective fixed positions; and at least two sensors for detecting the position of the sliding member.

In a method aspect there is provided a method of moving a cursor on a display screen with an input device by sliding a slide element attached to a first magnet over a second magnet located in a fixed position, whereby by relative movement of the slide element is measured by at least two sensors and translated into movement of the cursor.

BRIEF DESCRIPTION OF THE DRAWINGS

The invention, together with further objectives and advantages thereof, may best be understood by reference to the following description taken in conjunction with the accompanying drawings in which:

FIG. 3a shows a top view of the stacked cylindrical magnets of FIG. 2a;

DETAILED DESCRIPTION OF THE INVENTION

As discussed in the preceding sections, the use of conventional pointing devices often take up considerable space or contain components that are too bulky to be comfortably used with handheld devices. A primary reason for the bulk are the mechanical moving parts such as roller components in joysticks and trackballs that must be integrated into the device housing, for example. With touchscreens there is typically added bulk since the device housing is usually designed to store an external pointing device (stylus) when not in use. Contributing to the problem are the relatively bulky mechanical sensors that need to be incorporated into the main unit to detect and translates physical movement of the device into cursor movement. As handheld devices continue to decrease in size, conventional mechanical solutions become even more untenable. As put forth by the invention, a low profile magnetic input device that is particularly suitable for use in handheld devices is described in the following embodiments.

Figure 1:
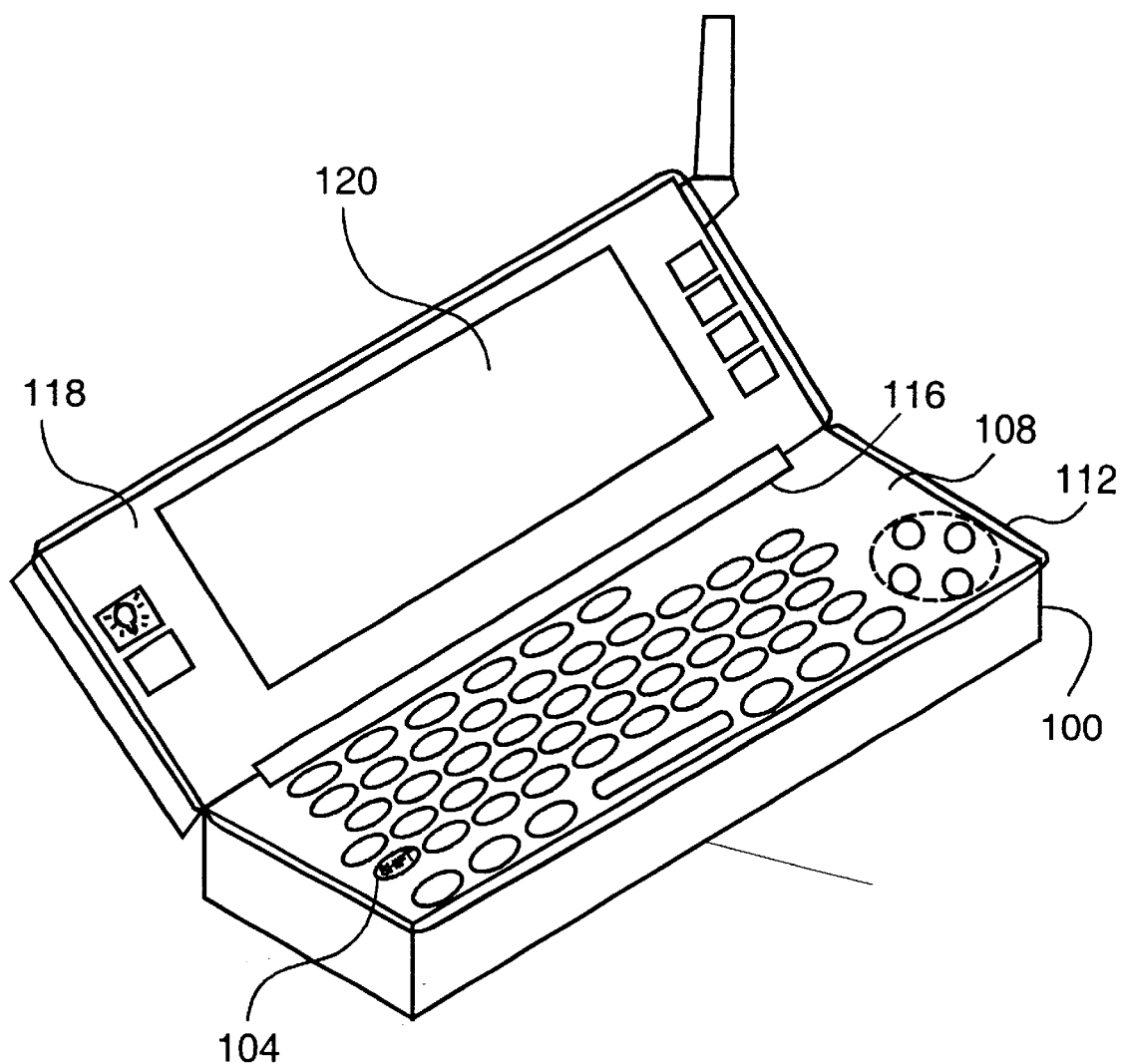
FIG. 1 shows a handheld device exemplifying the space constraints of small footprint devices.
Figure 2A:
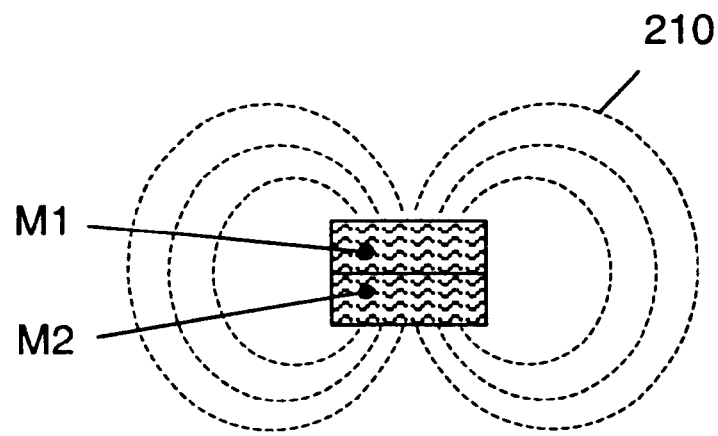
FIG. 2a illustrates the principle of magnetic attraction for centering two stacked cylindrical magnets.

FIG. 2a illustrates the principle of how magnets can be used to return an input device to its balanced center position in accordance with the invention. The figure shows a side view of two permanent cylindrical (or annular) magnets and their resulting magnetic flux densities. Permanent magnets consist of polarized charged particles that radiate magnetic flux, as shown by 210. The flux lines radiate out in an elliptical manner and always start at the North Pole and seek a South Pole, which is normally at the other end of the magnet. As shown in the figure, permanent magnets that are stacked such that the North Pole of a magnet 1 (M1) always faces the South Pole of an adjacent magnet 2 (M2) results in the magnets attracting each other and maximizes the flux density. The two attracting magnets exhibit a tendency to return to the state of maximum combined flux thus the magnets will tend to return to this centered position despite any applied external forces.

Figure 2B:
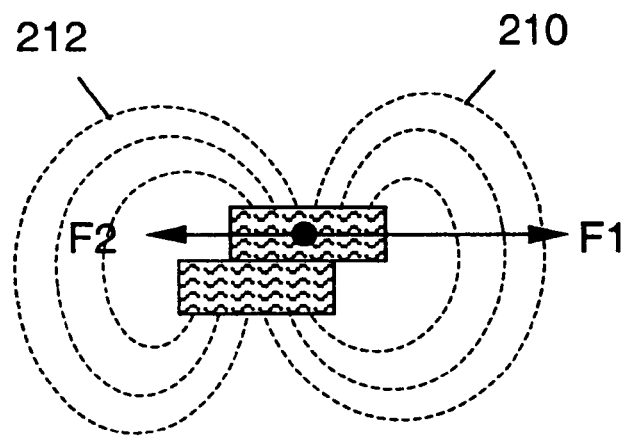
FIG. 2b illustrates the resulting movement when a lateral force is applied to the top magnet.

FIG. 2b illustrates the situation when an external lateral force F1 is applied to M1 with M2 being fixed. M1 is able to slide laterally when force F1 becomes greater than the magnetic attraction or return force F2, which is tendency for the magnets to remain centered. As the M1 is pushed away from balance, the flux density 210 and 212 becomes distorted as M1 moves farther from the center. As a consequence, the force F1 required for moving M1 increases as it moves farther from the center. At some point though, the attractive force F2 between the magnet disappears when the M1 moves too far. When the force F1 is released and before the attraction force disappears, M1 snaps back to its original centered position illustrated in FIG. 2a.

As the magnets move away from their balanced center position, the flux field becomes distorted as described above. This distortion in the magnetic field can be detected by a magnetic field sensor such as a Hall sensor. Hall sensors are electromagnetic transducers that produce a voltage proportional to the strength of a magnetic field (or flux density) passing through them. The magnetic flux density can come either from a permanent magnet or an electric current thus making them suitable for measuring current as well. Hall sensors convert the magnetic field into voltage which can be used to accurately determine the relative position of the magnets.

Figure 3A:
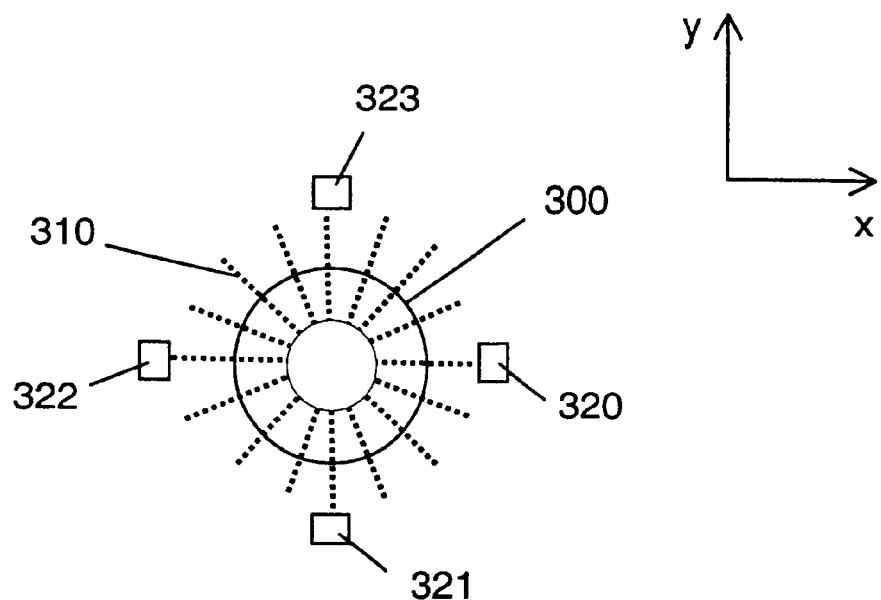
Figure 3B:
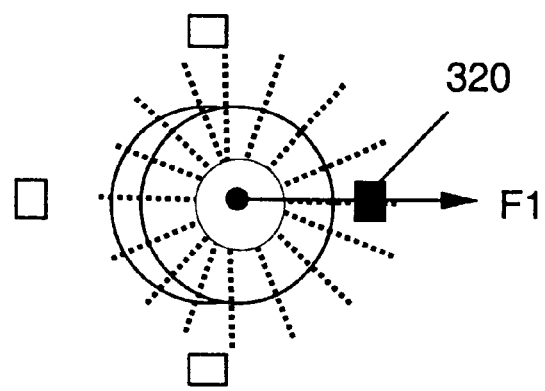
FIG. 3b shows a top view of the displacement of the top magnet when the lateral force is applied.

FIG. 3a shows a top view of the stacked annular magnets of FIG. 2a shown together with magnetic field sensors. While in the centered position, the magnets 300 emit a magnetic flux 310 from the north to south poles. The magnetic flux 310 is detected by four accurately positioned Hall sensors 320–323 that measures any change in the magnetic flux as the magnet moves in the x-y plane. In the center position the flux generates equal currents in all four of the Hall sensors indicating an equilibrium state translating e.g. into no cursor movement. FIG. 3b shows when the top magnet is moved when a force F1 is applied to it. The change in position in the x direction causes the flux to distort toward the Hall sensor 320 positioned closest. This generates a greater current in the sensor which can be translated into electrical signals signifying movement to a computing device. The principles as described above, form the basis for a magnetic input device operating in accordance with the present invention.

Figure 4A:
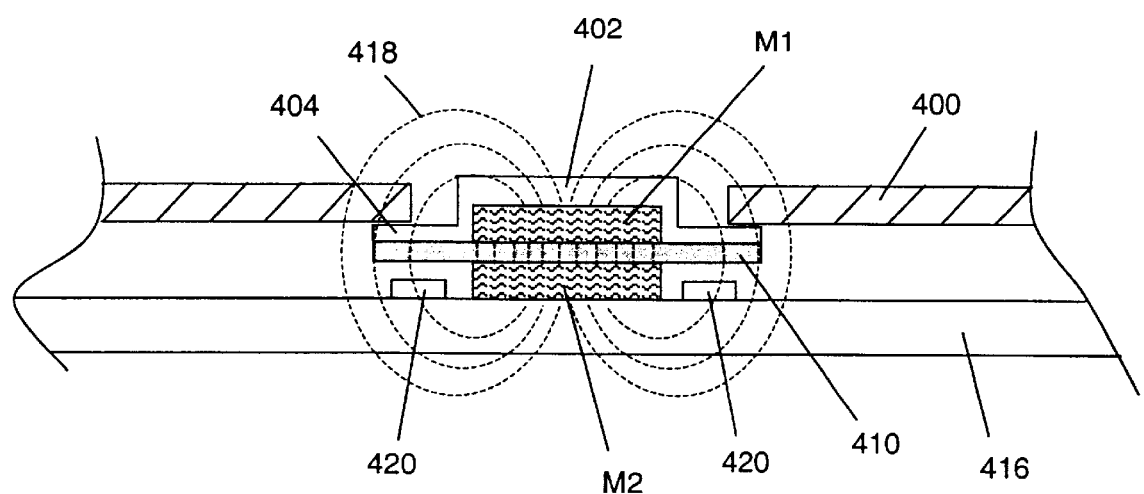
FIG. 4a shows a cross sectional side view of a magnetic planar joystick in accordance with a first embodiment of the invention.

FIG. 4a shows a first embodiment of a magnetic input device as exemplified by the invention. A side view of a two-dimensional magnetic planar joystick is illustrated integrated into the housing of a handheld device. A pair of magnets M1 and M2 are stacked in the equilibrium center position. The planar joystick is a plastic button that can be moved by a finger in any direction in the x-y plane. The button is formed such that the finger on the a button top 402 slides M1 in the desired direction. The button extends down over M1 to form a lip 404 that slides under the device housing 400 as the button is moved. The lip also prevents the button from lifting out of the housing unintentionally. In the center position, M1 is stacked on top of M2 and separated by a slide element 410 to facilitate sliding by reducing friction. The slide element 410 can be made of any durable low friction component that does not block magnetic fields such as polytetrafluoroethylene (PTFE) polymer. The slide element 410 is attached to M2 with an adhesive, for example. M2 is fixed and attached to a printed circuit board 416. Also fixed to the circuit board 416 are the Hall sensors 420 for measuring the change in magnetic flux 418 resulting from the movement of M1.

Figure 4B:
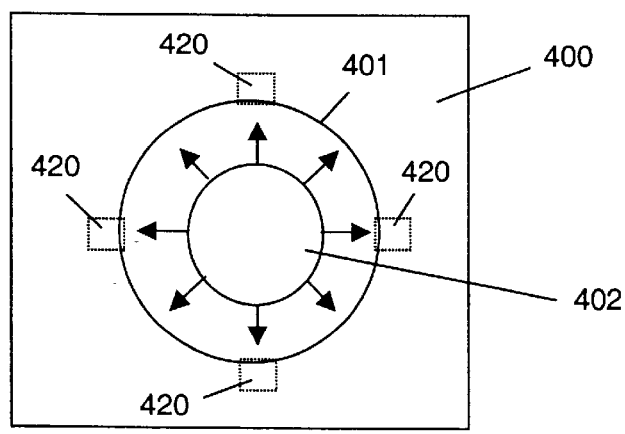
FIG. 4b shows a top view of the magnetic planar joystick of the first embodiment.

FIG. 4b shows a top view of the magnetic planar joystick of the first embodiment. The button top 402 is slid by a finger in the direction the user wishes to move the cursor. The motion of the button is constrained by housing wall 401 in all directions. As M1 is moved, the change in flux is sensed by embedded Hall sensors 420. Moreover, as the button is slid in a direction further from the center the more force is exerted to return it back to the center. This form of analog feedback indicates to the user that the cursor is moving faster when the button is slid farther away.

Figure 5A:
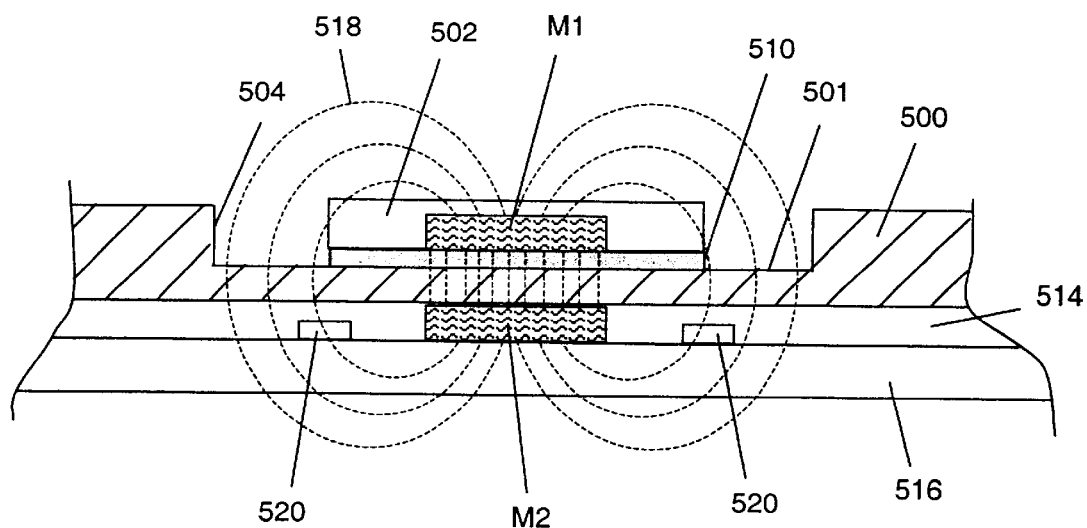
FIG. 5a shows a cross sectional side view of a magnetic planar joystick in accordance with a second embodiment of the invention.

FIG. 5a shows a side view of a planar joystick in accordance with a second embodiment of the invention. The embodiment uses two cylindrical magnets where a plastic button top 502 is encapsulated over M1. A slide element 510 is attached to the bottom of M1 and button 502 such the entire unit slides within a recess 501 in device housing 500. The movement of the button within the recess is constrained by the recess walls 504. Attached to a printed circuit board 516 is a second cylindrical magnet M2 and Hall sensors 520. A filler layer 514, which could be just air or a material that to provide support for attaching device housing 500. As the button containing M1 is slid, magnetic flux field 518 distorts accordingly which is detected by the Hall sensors 520. The magnetic force between magnets M1 and M2 is preferably so strong as to prevent magnet M1 from lifting out of the recess 501 (and thus helps to avoid accidentally losing magnet M1). For example ring magnets have a very strong magnetic force.

Figure 5B:
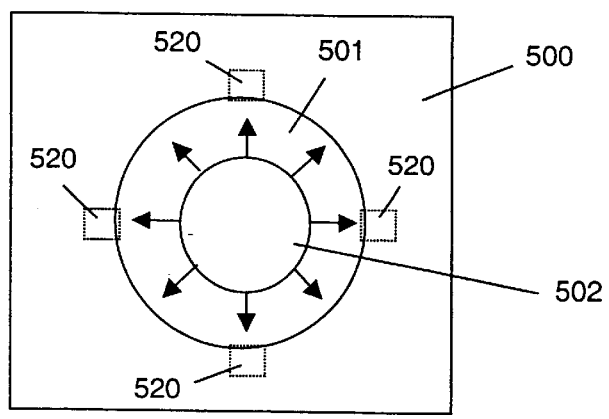
FIG. 5b shows a top view of the magnetic planar joystick of the second embodiment.

FIG. 5b shows a top view of the magnetic planar joystick of the second embodiment. Button 502 slides within recess surface 501 distorting the magnetic flux of M1 and M2 which is detected by Hall sensors 520 positioned around the recess. Cursor movement is translated from the movement of M1 for display on the screen of the handheld device. The embodiment also provides sufficient analog feedback to the user during use.

Figure 6:
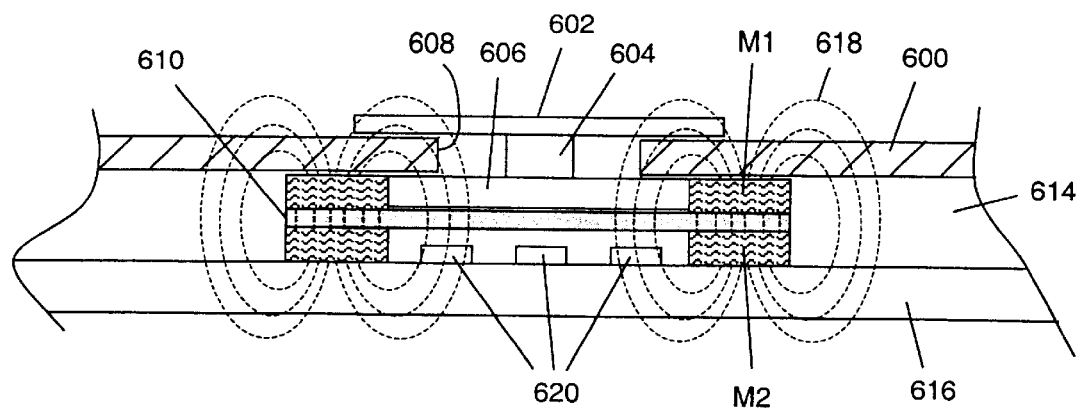
FIG. 6 shows a cross sectional side view of a 2-D planar joystick using two ring magnets in accordance with a third embodiment of the invention.

FIG. 6 shows a cross sectional side view of a 2-D planar joystick using two ring magnets in accordance with a third embodiment of the invention. The structure of the button is comprised of a button top 602 attached to a shaft 604 which is attach to a base 606. The base prevents the button from lifting out of the housing and provides secure sliding surface for the joystick. The base 606 fits inside ring magnet M1 which moves laterally on top of slide element 610 when the button top 602 is slid. Ring magnet M2 is fixed to printed circuit board 616 together with Hall sensors 620 that are located inside the ring M2. The Hall sensors 620 are positioned to detect the change in flux 618 and 619 as the button slid. The motion of the button is restricted by the shaft bumping up against the device housing wall 608 where button movement causes the magnetic flux density 618 is distorted when the button is slid in any direction. The magnetic attraction between M1 and M2 provides the natural centering effect for the button.

Figure 7:
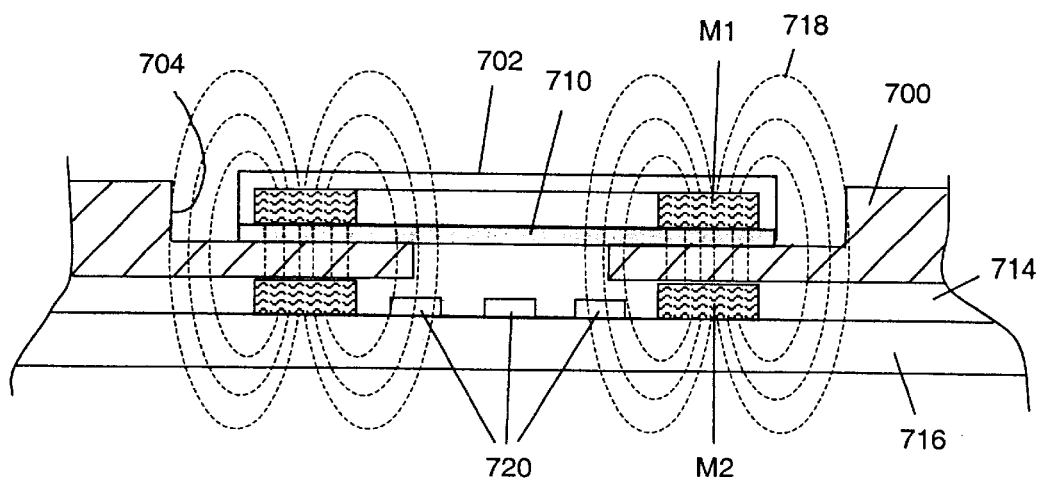
FIG. 7 shows a cross sectional side view of a 2-D planar joystick using two ring magnets in accordance with a forth embodiment of the invention.

FIG. 7 shows a cross sectional side view of a 2-D planar joystick using two ring magnets in an alternative construction and in accordance with a third embodiment of the invention. The embodiment comprises a button top 702 the entirely covers the ring magnet M1. Attached to the bottom of the ring magnet M1 is a sliding element 710 such that the entire unit slides within a recess of device housing 700. Movement of the button assembly is restricted by the device housing walls 704. Ring magnet M2 is fixed to printed circuit board 716 along with the placement of Hall sensors 720 inside M2. The magnetic flux densities of 718 and 719 from the magnets are distorted when the button is slid in any direction. The embodiment is a simpler construction in that it lacks the means for preventing the button from lifting out of the recess. Movement of button 702 causes the magnetic flux density 718 is distorted when the button is slid in any direction where the magnetic attraction between M1 and M2 provides the natural centering effect for the button.

In a variant the two dimensional planar joystick, a fifth embodiment comprised of a one dimensional scrolling device using a similar construction to the two dimensional planar joystick. The construction can be based on FIG. 4a where the sliding movement of the button along a groove or rail causes flux distortion which is detected by two Hall sensors. An exemplary application of this arrangement is a bi-directional scrolling device for scrolling through pages on a handheld device.

Figure 8:
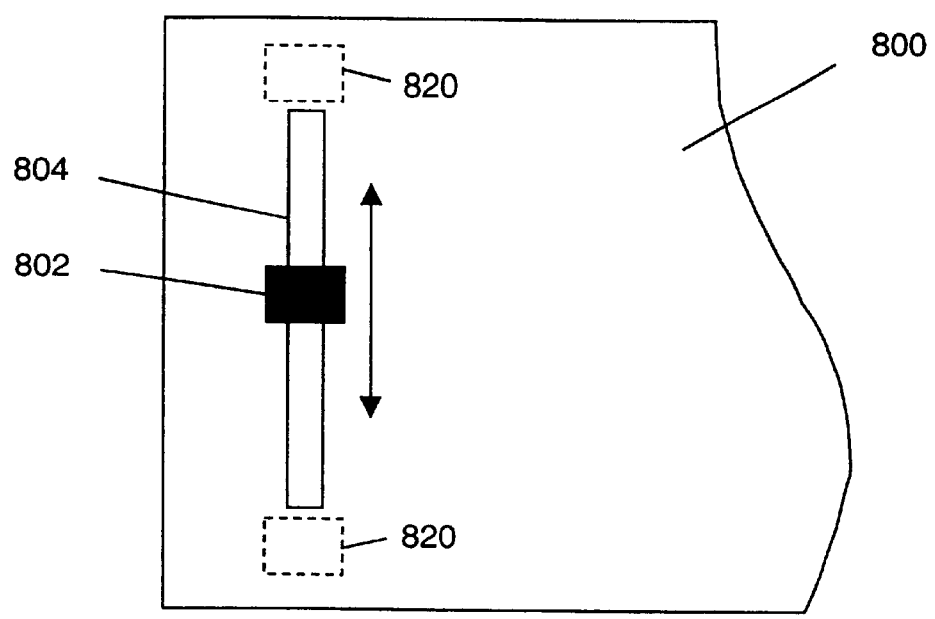
FIG. 8 illustrates a top view of the 1-D scrolling device in accordance with a fifth embodiment of the invention.

FIG. 8 illustrates a top view of the one-dimensional scrolling device in accordance with a fifth embodiment of the invention. A scrolling button 802 attached to a magnet M1 which slides along groove 804 formed within device housing 800. M1 slides over a magnet M2 that is in the center position in the groove thereby causing a distortion of the magnetic flux when the button is slid. The distortion in flux is detected by a pair of embedded Hall sensors 820 positioned near the ends of the sliding path.

In addition to input devices that provide continuous analog feedback, there are applications where digital feedback can be beneficial. By way of example, a hands free scroller switch can be implemented to automatically scroll text up or down. The switch may include at least three positions where a middle position provides no scrolling, an upper position to provide scrolling up and a lower position for scrolling down. With several additional steps in either direction could make the scrolling faster. Digital force feedback can be achieved by "hopping" a sliding magnet from one stationary magnet to another stationary magnet.

Figure 9A:
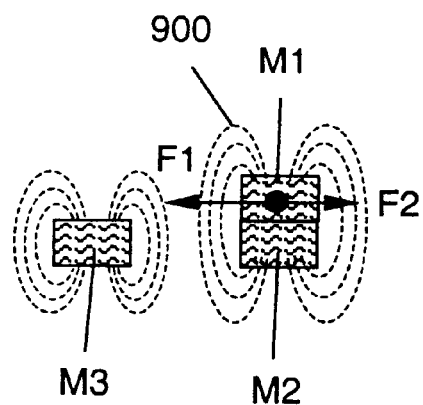
FIG. 9a shows the principle of digital force feedback for movement in discrete steps.
Figure 9B:
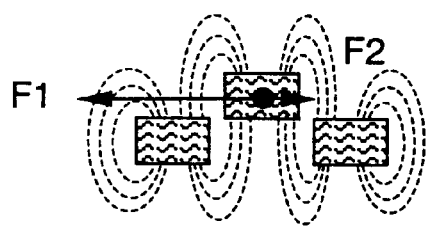
FIG. 9b shows the flux of a magnet midway in transition between two magnets.
Figure 9C:
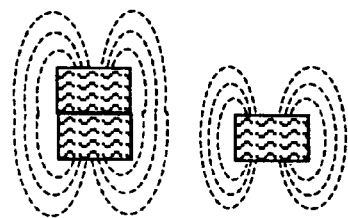
FIG. 9c shows the completion of a discrete step resulting from the magnet being attracted to the second magnet.

FIG. 9a shows the principle of how digital force feedback is carried out. The magnetic flux from M1 and M2 combines to keep the magnets balanced in the stacked position shown. As an external lateral force F1 is applied to M1 the flux starts to distort resulting in a return force F2 tending to pull M1 back toward M2. When M1 reaches a position midway between M2 and M3, as shown in FIG. 9b, the flux density becomes divided between M2 and M3 resulting in the attractive force from M3 exactly balancing that from M2. As M1 moves closer to M3, the attractive force from M3 begins to overcome the force from M2 thereby causing M1 to snap to a centered position on top of M3, as shown in FIG. 9c. In its simplest form, this digital movement can be implemented where the button is of a construction such that it travels within a groove or on a rail to provide movement in discrete steps.

Figure 10:
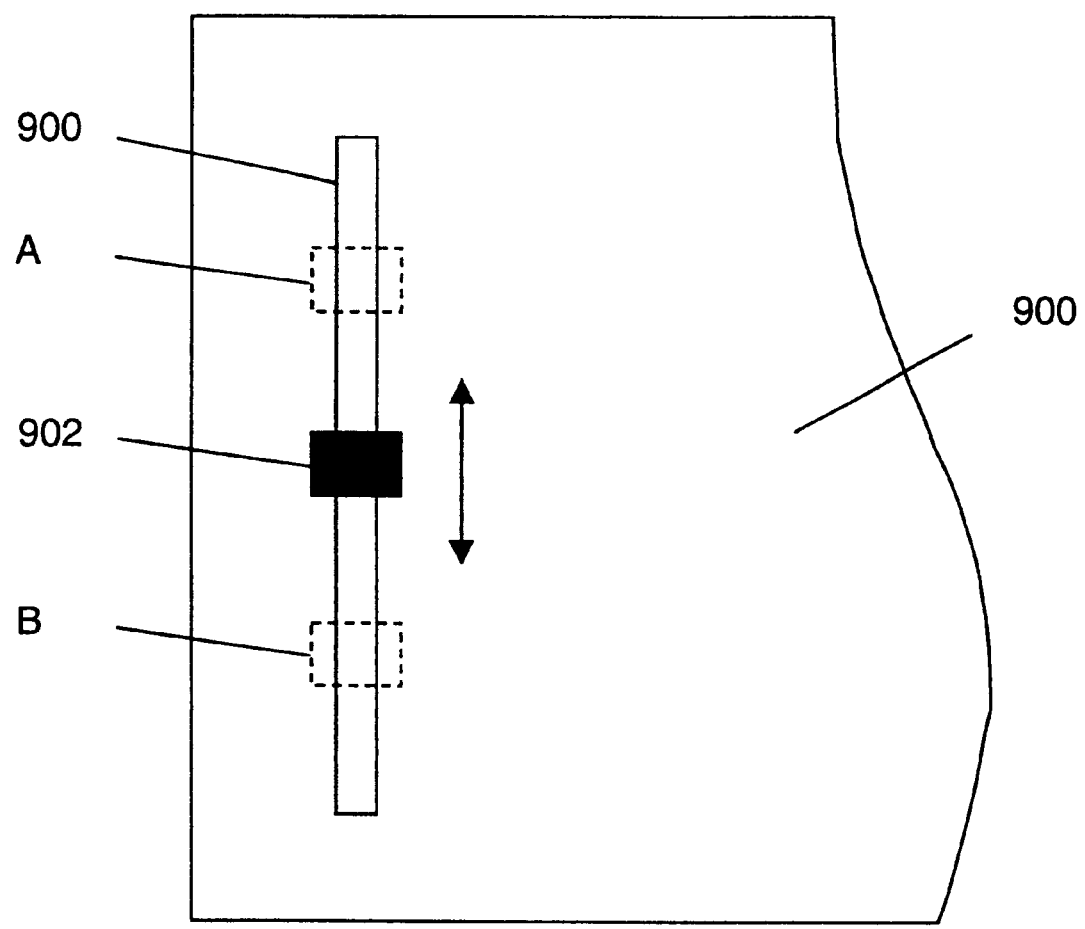
FIG. 10 shows a 1-D slidable device moving in discrete steps in accordance with a sixth embodiment of the invention.

FIG. 10 shows a discrete scrolling one-dimensional input device operating in accordance with the invention. A button 902 can be slid upwards along groove 900 to position A or slid downwards to position B. There are permanent magnets fixed underneath at positions A and B which designate button selection positions. The discrete nature of the input device provides positive force feedback in that the user is assured that the a feature is selected when the button fully clicks into position. It should be noted that the embodiment is not restricted to one-dimensional movement and that the invention can be implemented for discrete movement in two dimensions e.g. to replace the conventional four arrow key navigation.

Figure 11:
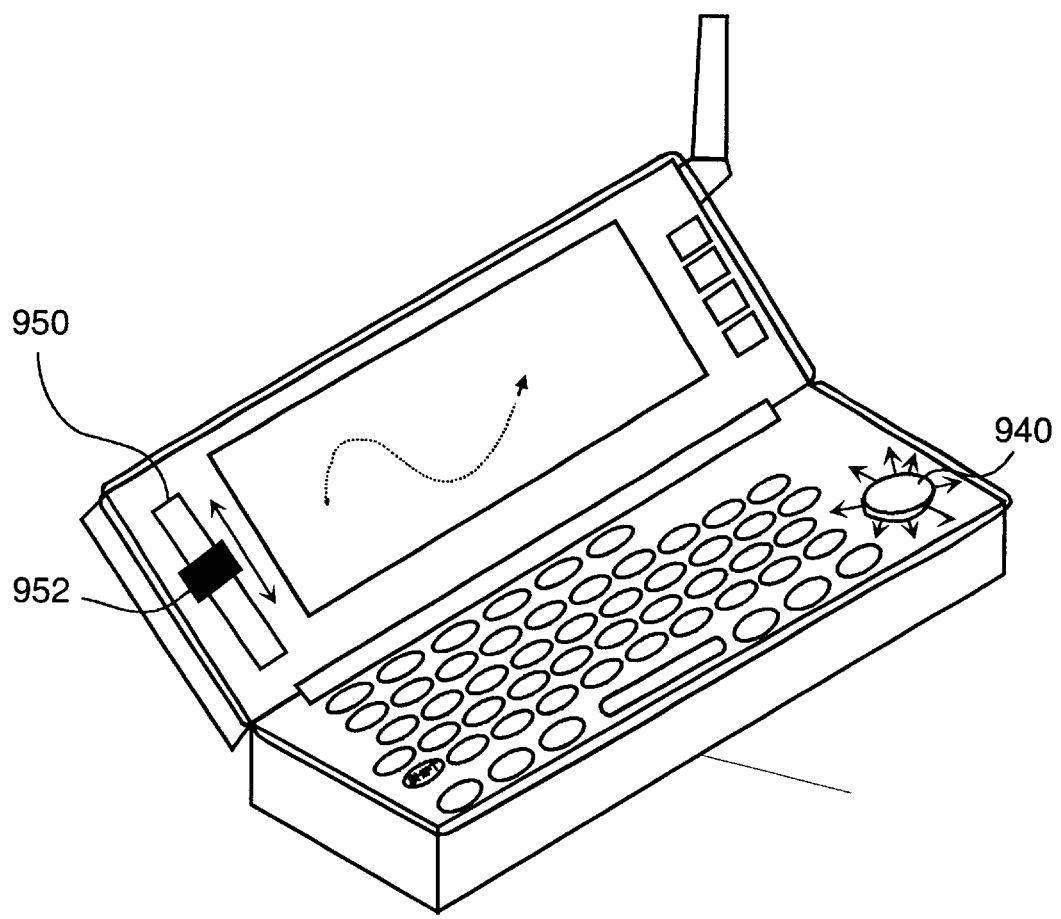
FIG. 11 illustrates an exemplary handheld device implementing the input device of the present invention.

FIG. 11 illustrates an exemplary handheld device implementing the input devices as described in the invention. A two dimensional planar joystick 940 is implemented to replace the four arrow keys used in the prior art. The planar joystick is free to move in any direction in the x-y plane (as indicated by the arrows) whereby the motion of the planar joystick causes a corresponding movement of the cursor on the device display. The invention provides an quick, easy and intuitive way to move a cursor in small form factor devices. Moreover, the planar joystick lends itself particularly well for use in compact handheld devices because of its low profile button configuration.

A second exemplary implementation of the invention in the handheld device is a sliding button 952 along groove 950. The button can be used for scrolling through pages that are too big to be displayed at once. The scrolling device can be an analog slider as described in embodiment five which is balanced at the center. As the button is slid up or down, the displayed page scrolls up or down accordingly. The use of discrete sliding buttons can also be implemented in the handheld device, in addition to the scrolling function previously outlined, for a number of functions such as setting the contrast of the display or selecting menu functions, for example. In this application, the different positions of the button corresponds to a different level of contrast or may activate a menu function such as a phonebook, email, or the internet.

Although the invention has been described in some respects with reference to a specific embodiments thereof, variations and modifications will become apparent to those skilled in the art. For example, as it is clear that the present invention is intended for use with a display, the device of the invention need not be integrated into the same device as the display, but can be attachable to a display or to a device having a display, i.e. can be attachable as a mouse or integrated into an attachable keyboard. It is therefore the intention that the following claims not be given a restrictive interpretation but should be viewed to encompass variations and modifications that are derived from the inventive subject matter disclosed.

What is claimed is:

1. An input device for moving a cursor on a display screen comprising:
   a device housing;
   a movable planar sliding member having a first ferromagnetic element attached thereto;
   a second ferromagnetic element located in a fixed position relative to the first ferromagnetic element and attached so that facing magnet surfaces of said first and second ferromagnetic elements have inverse polarities in order to provide a centering effect for the sliding member; and
   at least two sensors for measuring the relative movement of the sliding member.

2. An input device according to claim 1 wherein the first ferromagnetic element and the second ferromagnetic element are shaped as annular rings.

3. An input device according to claim 1 wherein the sensors are magnetic flux sensors that generate a current proportional to the density of the detected flux which is translated to signals interpreted by the input device into cursor movement.

4. An input device according to claim 1 wherein the motion of the sliding member is restricted to movement in one dimension by traveling within a groove or on a rail.

5. An input device according to claim 1 wherein the slide element is slidably engaged within a recess in the device housing.

6. An electronic device comprising a display screen for displaying a cursor during operation of the device, the electronic device is characterized in that the device includes an input device for moving a cursor on a display comprising:
   a movable planar sliding member having a first ferromagnetic element attached thereto;
   a second ferromagnetic element located in a fixed position relative to the first ferromagnetic element and attached so that facing magnet surfaces of said first and second ferromagnetic elements have inverse polarities in order to provide a centering effect for the sliding member; and
   at least two sensors for measuring the relative movement of the sliding member.

7. A electronic device according to claim 6 wherein the first magnet and second magnet are permanent annular ring magnets.

8. A electronic device according to claim 6 wherein the sensors are magnetic flux sensors that generate a current proportional to the density of the detected flux which is translated to signals interpreted by the electronic device into cursor movement.

9. A electronic device according to claim 6 wherein the motion of the sliding member is restricted to movement in one dimension by traveling within a groove or on a rail.

10. A electronic device according to claim 6 wherein the slide element is slidably engaged within a recess in the device housing.

11. A sliding input device moving in discrete steps between a first fixed position and a second fixed position for selecting a function on a electronic device, the input device comprising:
    a movable planar sliding member having a first magnet attached thereto, a facing magnetic surface of said first magnet having an inverse polarity with respect to a second and third magnet in order to provide a centering effect for the sliding member;
    said second magnet fixed in position at the first fixed position;
    said third magnet fixed in position at the second fixed position a proximate distance from the first position;
    a support layer for supporting the second magnet and the third magnet in their respective fixed positions; and
    at least two sensors for detecting the position of the sliding member.

12. A discrete sliding input device according to claim 11 wherein the sliding member moves in one dimensional motion between the first position and the second position within a groove or on a rail.

13. A discrete sliding input device according to claim 11 wherein the sliding member moves in a two dimensional manner in discrete steps.

14. A method of moving a cursor on a display screen with an input device by sliding a planar slide element attached to a first magnet over a second magnet located in a fixed position and attached so that facing magnet surfaces of said first and second magnets have inverse polarities in order to provide a centering effect for the sliding member, whereby by relative movement of the slide element is measured by at least two sensors and translated into movement of the cursor.

* * * * *